(12) United States Patent
Arand

(10) Patent No.: US 7,111,872 B2
(45) Date of Patent: Sep. 26, 2006

(54) RESTRAINT SYSTEM FOR A MOBILE MACHINE

(75) Inventor: Patrick Arand, Hamburg (DE)

(73) Assignee: STILL GmbH, Hamburg (DE)

( * ) Notice: Subject to any disclaimer, the term of this patent is extended or adjusted under 35 U.S.C. 154(b) by 288 days.

(21) Appl. No.: 10/635,926

(22) Filed: Aug. 6, 2003

(65) Prior Publication Data

US 2004/0075266 A1 Apr. 22, 2004

(30) Foreign Application Priority Data

Aug. 8, 2002 (DE) .............................. 102 36 447

(51) Int. Cl.
*B60R 22/00* (2006.01)
(52) U.S. Cl. ..................... 280/801.1; 180/268; 280/802
(58) Field of Classification Search ............. 280/801.1, 280/802, 803, 807, 808; 180/271, 268, 270; 297/468, 469, 481; B60R 21/02, 22/02
See application file for complete search history.

(56) References Cited

U.S. PATENT DOCUMENTS

| | | | | |
|---|---|---|---|---|
| 3,743,319 A | * | 7/1973 | Winchell | ..................... 280/803 |
| 3,902,074 A | * | 8/1975 | Uota | ........................... 180/270 |
| 4,124,224 A | * | 11/1978 | Matsuoka | .................... 280/807 |
| 4,213,637 A | * | 7/1980 | Mauron | ....................... 280/802 |
| 4,416,468 A | * | 11/1983 | Cunningham | ............... 280/802 |
| 4,416,469 A | | 11/1983 | Cunningham et al. | |
| 4,441,737 A | * | 4/1984 | Wimmer et al. | ............ 280/804 |

FOREIGN PATENT DOCUMENTS

DE 197 17 622 A1 10/1998

* cited by examiner

*Primary Examiner*—Paul N. Dickson
*Assistant Examiner*—Tiffany Webb
(74) *Attorney, Agent, or Firm*—The Webb Law Firm

(57) ABSTRACT

A restraint system is provided for a mobile machine (1), in particular an industrial truck, with a driver's seat (2) and a safety belt (3). The restraint system has a variable-length mechanical connection (6) between a front part (4) of the roof that covers the driver's seat or the driver's cab and the safety belt (3). The variable-length mechanical connection (6) makes it easier for the operator to attach the safety belt (3). The operator will also attach the safety belt (3) because otherwise it will be difficult or impossible to use the control elements (5). The variable-length mechanical connection (6) simultaneously prevents bypassing of a device to detect whether the safety belt (3) is closed.

20 Claims, 3 Drawing Sheets

RESTRAINT SYSTEM FOR A MOBILE MACHINE

CROSS REFERENCE TO RELATED APPLICATION

This application corresponds to German Application No. 102 36 447.8 filed Aug. 8, 2002, which is herein incorporated by reference in its entirety.

BACKGROUND OF THE INVENTION

1. Field of the Invention

This invention relates to a restraint system for a mobile machine, such as an industrial truck, with a driver's seat and a safety belt.

2. Technical Considerations

One of the most dangerous and most common types of accidents involving the operation of an industrial truck occurs when the operator is seated and the truck tips over, in which case the unprotected operator can fall out of the driver's cab and can be pinned beneath the industrial truck. A variety of restraint systems are currently used to prevent the driver from falling out of the truck. The most common of these systems have belts, in particular lap belts. However, the driver often finds it too much trouble to keep fastening and unfastening the belt, especially when he has to frequently climb into and out of the truck. Therefore, belt contact switches are commonly used to force the driver to fasten the belt since it is possible to operate the industrial truck only when the belt clip has been inserted into the belt buckle. However, this safety mechanism can be bypassed by looping the safety belt behind the backrest of the driver's seat and closing it, in which case the driver can operate the industrial truck unsafely in spite of the fact that the belt contact switch has been actuated.

Therefore, it is an object of the invention to provide a restraint system for a mobile machine, such as an industrial truck, with a driver's seat and a safety belt that permits the driver to enter and exit the cab easily and comfortably and simultaneously ensures that the belt is used correctly by a driver.

SUMMARY OF THE INVENTION

The invention provides a variable-length mechanical connection that can be located between a component located in front of the driver's seat and the safety belt. This arrangement makes it easier for the driver to enter the cab because the safety belt is held by the connection so that as the driver enters the cab, the belt already encircles half his body and the belt clip need only be guided a short distance into the belt buckle. Moreover, the belt can be located in front of the driver so that the driver must close the belt to be able to operate the industrial truck easily.

It is particularly advantageous if the mechanical connection includes a cable and/or a belt, because this arrangement results in a flexible connection which represents less of an obstacle than rigid connections when the driver enters and exits the cab. One end of the mechanical connection can be connected to the industrial truck, e.g., a support, and the other end can be connected to the safety belt.

Advantageously, means can be present for elastic tensioning of the cable or belt that forms the mechanical connection to guarantee easy entry and exit even when the safety belt is adjusted to different lengths.

It is appropriate to provide means to retract the cable or belt that forms the mechanical connection to take up slack in the safety belt which can make entry more difficult.

Because the height of the fastening point of the mechanical connection to a component that is located in front of the driver's seat can be adjustable, the belt clip will be within easy reach of the driver and will simultaneously facilitate entry and exit.

Advantageously, means can be provided to limit the retraction distance of the cable or belt that forms the mechanical connection as well as the distance the safety belt is retracted. The belt clip can thereby be positioned in an area where it makes possible easy access for the driver.

It is particularly advantageous if the mechanical connection taught by the invention is configured so that it can be retrofitted on existing mobile machines, so that older units can also be brought into compliance with the latest safety standards.

It is particularly advantageous if there are means to detect whether the safety belt is closed, thereby making it possible to detect a belt that is open and not in compliance with the applicable safety regulations.

It is, likewise, particularly advantageous if the restraint system is effectively connected by a signal line with the control system of the mobile machine so that the machine can be operated only when the safety belt is closed, thereby preventing accidental or unintentional use of the machine when the belt is not correctly closed. Because the machine can be placed in operation only when the belt is closed, it becomes possible to ensure that the user is properly protected during the operation of the machine and is thereby protected against a potential accident involving the machine.

BRIEF DESCRIPTION OF THE DRAWINGS

Additional advantages and details of the invention are explained in greater detail below with reference to the exemplary embodiment that is illustrated in the accompanying schematic drawings, in which.

DESCRIPTION OF THE PREFERRED EMBODIMENTS

Figure 1:
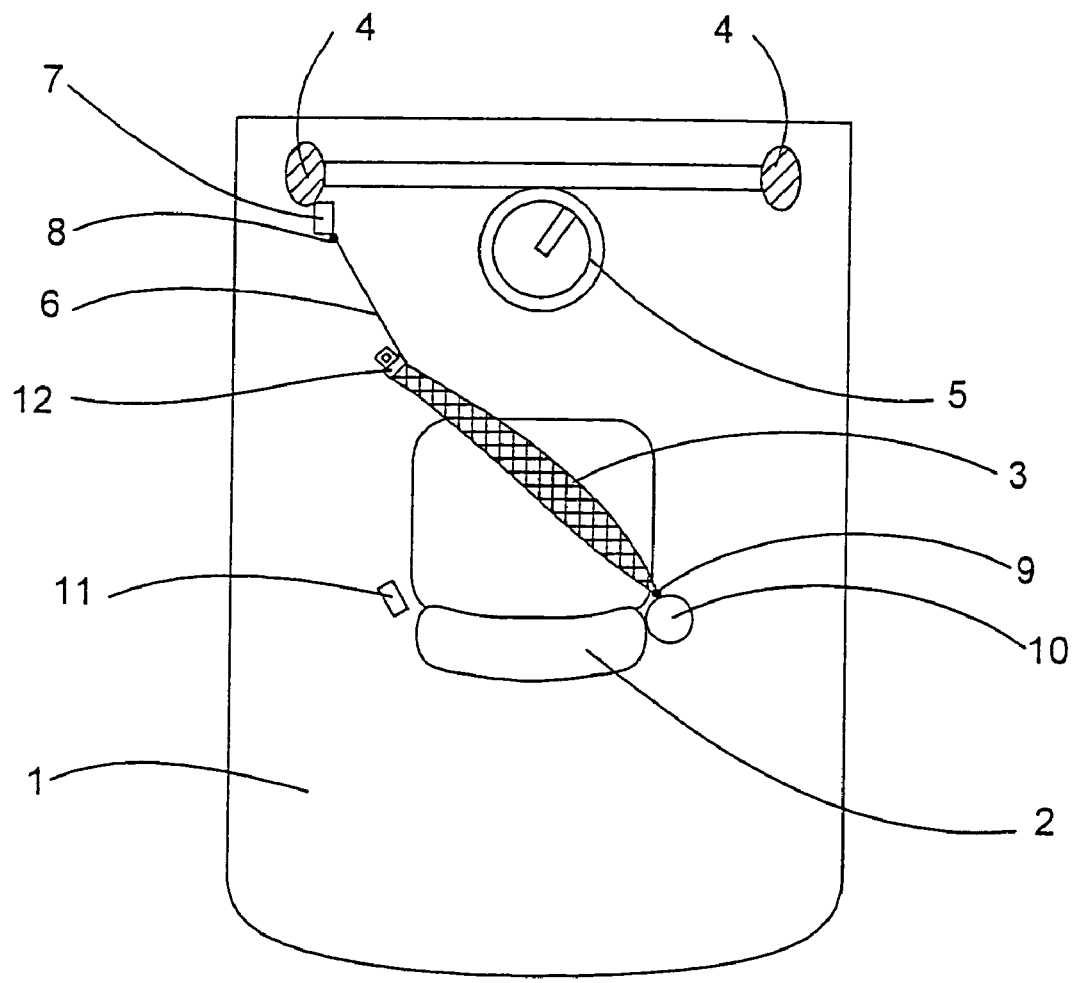
FIG. 1 is a plan view of a fork-lift truck with a mechanical connection of the invention extending between the front pillar of the roof that covers the driver's seat and the open safety belt.
Figure 2:
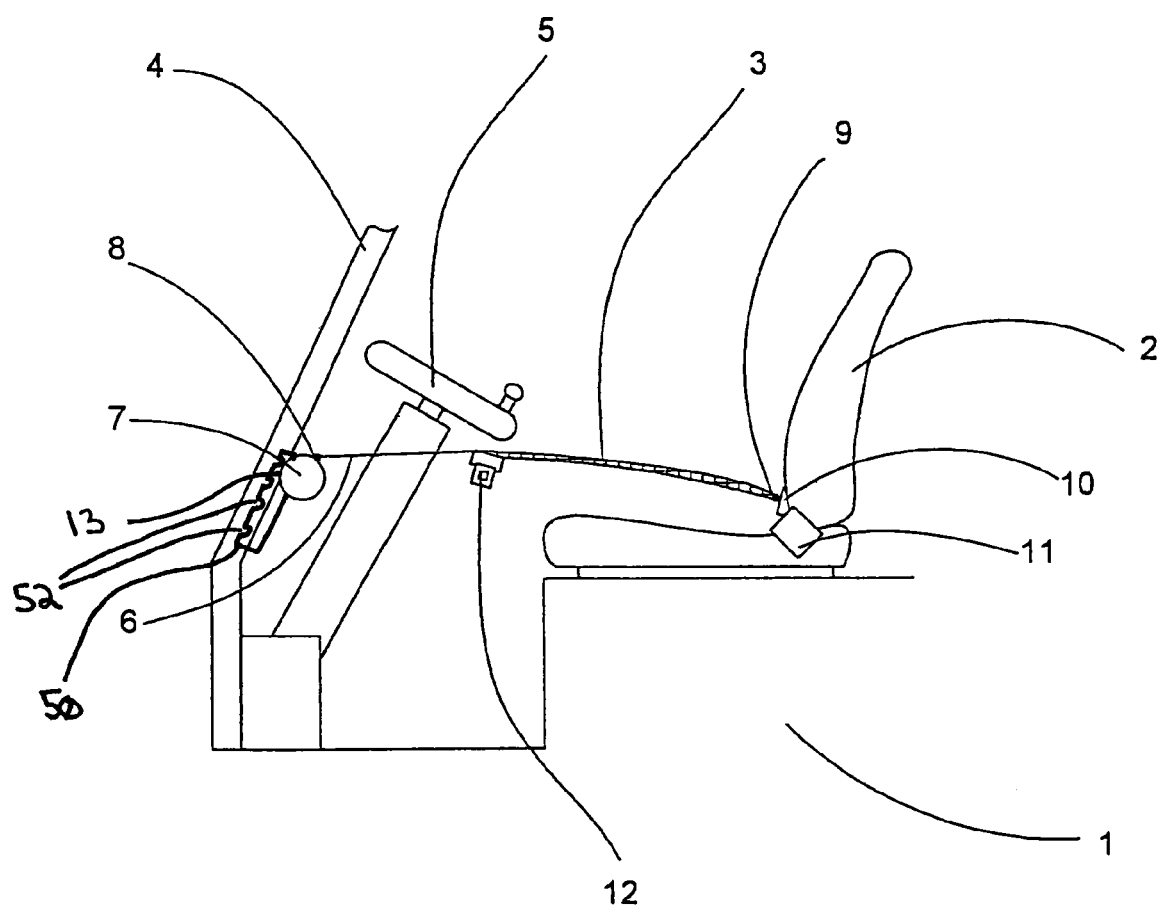
FIG. 2 is a side view of a fork-lift truck with the mechanical connection of the invention positioned between the front pillar of the roof that covers the driver's seat and the open safety belt.
Figure 3:
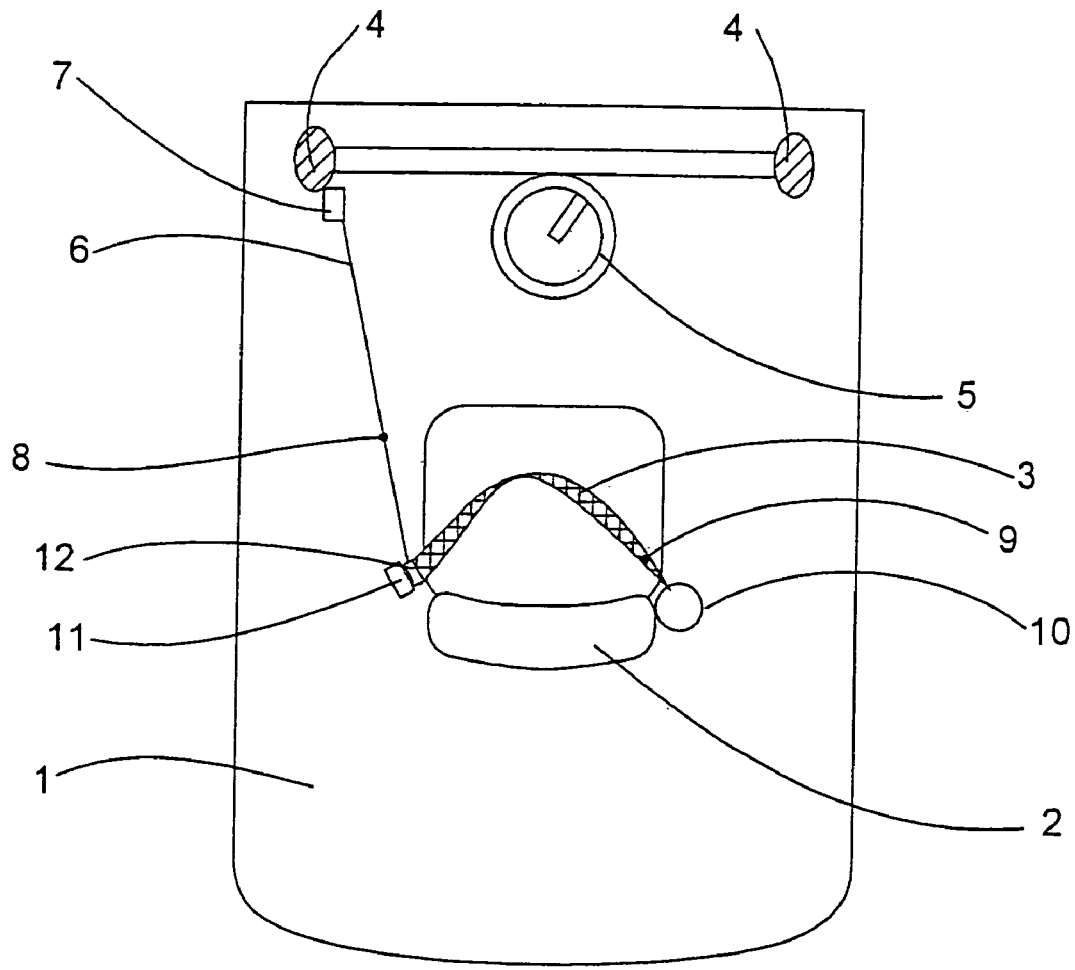
FIG. 3 is a plan view of a fork-lift truck with the mechanical connection of the invention positioned between the front pillar of the roof that covers the driver's seat and a closed safety belt.

FIG. 1 shows an overhead view of a fork-lift truck 1, by way of an exemplary embodiment of a mobile machine. Of course, other mobile machines, such as but not limited to tractors or traveling cranes, can be equipped with a device of the invention. For reasons of simplicity, only the front pillars 4 of the roof that covers the driver's seat are shown, while the roof itself and the corresponding rear pillars are not shown. The illustrated fork-lift truck 1 is equipped with a restraint system of the invention which, in the illustrated exemplary embodiment, includes a safety belt 3 fastened with a belt retractor 10 to the driver's seat 2. The safety belt 3 is connected by a mechanical connection (here in the form of a flexible cable 6) with a retraction device 7, for example a spring-loaded cable retractor. In the illustrated exemplary embodiment, the retraction device 7 is fastened to the left front pillar 4 of the roof that covers the driver's seat 2, although it can also be fastened to other components that are located in front of the driver's seat 2. The components in question can be installed on the industrial truck 1 solely for this purpose or can already be present and perform other functions. The distance the cable 6 can be retracted can be limited by a stop device 8, and the distance the belt 3 can be retracted can be limited by a stop device 9. This arrangement is illustrated in a side view in FIG. 2. The safety belt 3 is closed by inserting the belt clip 12 into the belt buckle 1, which results in the arrangement illustrated in FIG. 3.

The illustrated embodiment with a lap belt 3 is typical for mobile machines on account of their low speed of travel, although another type of belt system (for example, a three-point belt) can also be used. Likewise, instead of the cable 6, another type of flexible connection can be selected, such as a belt or strap, for example. To make it possible to close the belt 3, on account of the different distances of the belt clip 12 from the front pillar 4 in the open position and in the closed position, the cable 6 can be configured so that the length of the connection (cable 6) is variable.

A manual adjustment of the length of the mechanical connection (cable 6), followed by locking in position, is theoretically possible, for example by a clamping device attached to the pillar of the roof that covers the driver's seat 2, although an automatic adjustment of the length is preferable because of the ease of operation it makes possible. For this purpose, the connection (cable 6) itself can also be elastic, e.g., as a result of elastic fibers woven into the cable or belt.

When the driver mounts the driver's seat 2, he is already almost completely encircled by the belt 3, and all he has to do is to guide the belt clip 12 a short distance into the belt buckle 11. The driver will also be inclined to perform this action because, when the belt 3 is open, the belt 3 and the cable 6 can interfere with the operation of the control elements, such as the steering wheel 5, for example. When the belt 3 is closed, on the other hand, the operation and visibility of the truck are similar to those in conventional trucks.

To guarantee maximum comfort for the operator and an optimal adjustment of the belt 3, the belt 3 can be configured so that in the open position it is automatically retracted by the belt retractor 10. The stop device 9 can prevent the belt 3 from being retracted all the way, which would make it more difficult for the operator to use the belt. This stop device 9 can either be located on the belt 3 itself, as in the illustrated embodiment, or it can also be integrated into the mechanism of the belt retractor 10. On the other hand, the excessive retraction of the cable 6 and, thus, the excessive payout of the belt 3 by the retraction device 7 can also interfere with operation because the operator has to bend far forward to reach the belt clip 12. To prevent this, the stop device 8 for the mechanical connection 6 can be provided. This connection can, in turn, as in the stopping device 9, be a stop device 8 on the cable 6 or a component of the belt retraction device 7.

If the belt 3, unlike the illustrated embodiment, is not configured as an automatic belt, an elastic tensioning of the belt 3 in the open position is particularly helpful because it prevents slack in the belt 3 and holds it in a position that makes entry to the vehicle more comfortable. This can be realized by a retraction device 7 or by using an elastic connecting element 6, for example a cable that has rubber fibers woven into it.

If the height of the driver's seat 2 is adjustable, the height of the fastening point 13 (FIG. 2) of the mechanical connection 6 can also be adjustable to make possible comfortable entry and exit. This height adjustment can be realized by means of a technology that is conventionally used for such applications, such as the guidance of the fastening point 13 in a rail 50 with catches or notches 52, or a simple detachable screw connection, just to name a few.

To ensure that the operator actually wears the belt 3, means can be provided to detect whether the belt 3 is closed. These means can include, for example, a switch in the belt buckle 11, although other conventional means could also be used. If the belt 3 is not closed, the driver can be informed of this situation by an alarm signal, for example.

An even higher degree of safety is achieved if the restraining device is effectively connected by means of a signal line with the control system of the industrial truck 1 so that the truck 1 can only be operated when the belt 3 is closed. With belt systems of the prior art, such safety devices can easily be bypassed if the driver leaves the safety belt permanently closed and loops it around the back of the back rest, for example. This method of bypassing the safety system is now prevented by the mechanical connection 6 to the part 4 of the roof that covers the driver's seat in front of the driver's seat. This measure makes it easier for the driver to use the safety belt 3 properly and, thus, significantly improves safety.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A restraint system for an industrial truck, comprising:
    a driver's seat;
    a safety belt having a first end fastened at the driver's seat and a second end having a belt clip connectable to a belt buckle; and
    at least one variable-length mechanical connection connected to a component located in front of the driver's seat and to the second end of the safety belt,
    wherein in a non-fastened configuration the mechanical connection biases the second end of the safety belt directly toward the component independent of a vehicle door, such that the belt clip is manually connected to the belt buckle to fasten the safety belt.

2. The restraint system as claimed in claim 1, wherein the mechanical connection includes at least one cable or belt.

3. The restraint system as claimed in claim 2, including means for elastic tensioning of the mechanical connection.

4. The restraint system as claimed in claim 2, including means for retraction of the mechanical connection.

5. The restraint system as claimed in claim 2, wherein the height of the fastening point of the mechanical connection to the component located in front of the driver's seat is adjustable.

6. The restraint system as claimed in claim 2, including at least one means to limit retraction of the mechanical connection and/or at least one means to limit the distance the safety belt can be retracted.

7. The restraint system as claimed in claim 2, including means to detect whether the safety belt is closed.

8. The restraint system as claimed in claim 1, including means for elastic tensioning of the mechanical connection.

9. The restraint system as claimed in claim 8, including means for retraction of the mechanical connection.

10. The restraint system as claimed in claim 8, wherein the height of the fastening point of the mechanical connection to the component located in front of the driver's seat is adjustable.

11. The restraint system as claimed in claim 8, including at least one means to limit retraction of the mechanical connection and/or at least one means to limit the distance the safety belt can be retracted.

12. The restraint system as claimed in claim 1, including means for retraction of the mechanical connection.

13. The restraint system as claimed in claim 12, wherein the height of the fastening point of the mechanical connection to the component located in front of the driver's seat is adjustable.

14. The restraint system as claimed in claim 12, including at least one means to limit retraction of the mechanical connection and/or at least one means to limit the distance the safety belt can be retracted.

15. The restraint system as claimed in claim 1, wherein the height of the fastening point of the mechanical connection to the component located in front of the driver's seat is adjustable.

16. The restraint system as claimed in claim 15, including at least one means to limit retraction of the mechanical connection and/or at least one means to limit the distance the safety belt can be retracted.

17. The restraint system as claimed in claim 1, including at least one means to limit retraction of the mechanical connection and/or at least one means to limit the distance the safety belt can be retracted.

18. The restraint system as claimed in claim 1, wherein the variable-length mechanical connection is configured so that it can be retrofitted on existing mobile machines.

19. The restraint system as claimed in claim 1, including means to detect whether the safety belt is closed.

20. The restraint system as claimed in claim 1, wherein the restraint system is connected by a signal line with a control system of the mobile machine so that the mobile machine can be operated only when the safety belt is closed.

* * * * *